(12) United States Patent
Curtin et al.

(10) Patent No.: US 7,810,062 B2
(45) Date of Patent: Oct. 5, 2010

(54) METHOD FOR ELIMINATING NEGATIVE SLACK IN A NETLIST VIA TRANSFORMATION AND SLACK CATEGORIZATION

(75) Inventors: James J. Curtin, Fishkill, NY (US); William E. Dougherty, Jr., Pittsburgh, PA (US); Jose L. Neves, Poughkeepsie, NY (US); Douglas S. Search, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 11/853,573

(22) Filed: Sep. 11, 2007

(65) Prior Publication Data

US 2009/0070715 A1 Mar. 12, 2009

(51) Int. Cl.
G06F 17/50 (2006.01)
(52) U.S. Cl. .................. 716/6; 716/18; 716/2; 703/16
(58) Field of Classification Search ............... 716/6, 716/18, 2; 703/16
See application file for complete search history.

(56) References Cited

U.S. PATENT DOCUMENTS

| 5,095,441 | A | | 3/1992 | Hopper et al. | |
| 5,426,591 | A | * | 6/1995 | Ginetti et al. | 716/6 |
| 5,465,204 | A | | 11/1995 | Sekine et al. | |
| 5,764,525 | A | * | 6/1998 | Mahmood et al. | 716/18 |
| 5,903,471 | A | | 5/1999 | Pullela et al. | |
| 6,058,252 | A | * | 5/2000 | Noll et al. | 716/10 |
| 6,080,201 | A | * | 6/2000 | Hojat et al. | 703/14 |
| 6,401,231 | B1 | * | 6/2002 | Belkhale et al. | 716/6 |
| 6,412,101 | B1 | * | 6/2002 | Chang et al. | 716/10 |
| 7,013,443 | B2 | | 3/2006 | Iwai et al. | |
| 2003/0177455 | A1 | * | 9/2003 | Kaufman et al. | 716/2 |
| 2006/0010413 | A1 | | 1/2006 | Curtin et al. | |
| 2006/0010415 | A1 | | 1/2006 | Curtin et al. | |
| 2006/0015836 | A1 | | 1/2006 | Curtin et al. | |
| 2008/0127017 | A1 | * | 5/2008 | Alpert et al. | 716/10 |
| 2008/0295053 | A1 | * | 11/2008 | Dasdan et al. | 716/6 |
| 2009/0055786 | A1 | * | 2/2009 | Chang | 716/6 |

* cited by examiner

Primary Examiner—Phallaka Kik
(74) Attorney, Agent, or Firm—H. Daniel Schurmann (57) ABSTRACT

A method for eliminating negative slack in a netlist representing a chip design uses a contrived timing environment to overlay information onto the design environment during logic and physical synthesis phase. The overlaid timing information determines which netlist transformation provides a maximum leverage for the negative slack elimination and a way for creating a dynamic transformation recipe tuned for each design. The method further provides upper bounds on the negative slack elimination to prevent the netlist transforms from being applied to situations exceeding the capabilities for improving the design.

11 Claims, 5 Drawing Sheets

METHOD FOR ELIMINATING NEGATIVE SLACK IN A NETLIST VIA TRANSFORMATION AND SLACK CATEGORIZATION

FIELD OF THE INVENTION

This invention relates to the electronic design of Very Large Scale Integrated (VLSI) chips, and more particularly, to a method of eliminating negative timing slack in the chip to guarantee proper functionality.

RELATED PRIOR ART

The design of VLSI circuits has witnessed an unprecedented growth in the number and complexity of digital circuits. As a result, designers have adapted to this environment by using higher levels of abstraction in their designs, some of which have become proficient in managing the complexity of the design by developing new design languages and tools.

Figure 1A:
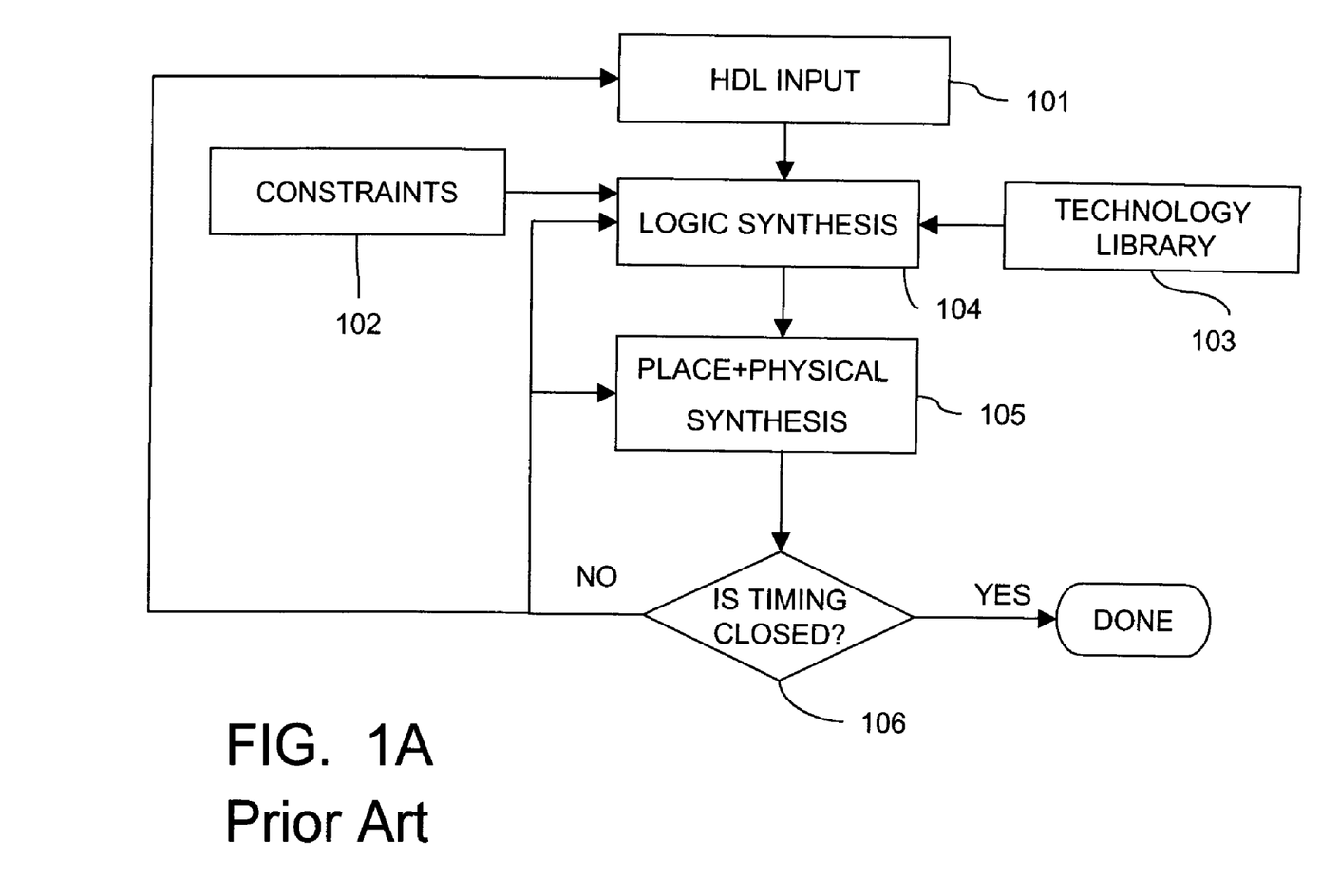
FIG. 1a illustrates a prior art method to achieve timing closure of a VLSI chip up to and including the placement and physical synthesis step.

Referring to FIG. 1a, there is shown a prior art flowchart illustrating the design of a VLSI chip beginning with a high-level description language (HDL) through the physical synthesis phase. The designer describes the functionality of the chip, preferably using HDL (step 101) as the input language or, alternatively, Verilog or VHDL (Very High Speed HDL). Further described are timing relationships that exist between specific portions of the design (step 102). The timing relationships are known as timing constraints. Examples of such constraints include the frequency or frequencies of operation, the expected arrival times and required arrival times at different parts of the design, such as I/O pins and the like.

Additionally, information pertaining to the technology used to fabricate the VLSI chip, as well as corresponding libraries of combinational and sequential elements forming the chip is also generated. This information is preferably stored in a Technology Library (step 103). In the next step, the HDL description is synthesized into a primitive logic (i.e., gate level) representation of the design (step 104). The outcome is a netlist specifying how gates from the selected library are connected to each other in order to implement the functions described in the HDL representation.

The netlist is typically the initial point of departure of the physical implementation of the design. For a given size of the chip, gates are placed so that they do not overlap with one another. Interconnects are then routed to provide physical connectivity, keeping in mind the need to minimize wire congestion. The placement phase is a multi-step process that combines timing driven placement constraints and timing optimization, also known as physical synthesis (step 105). This step secures the location for each gate of the design such that not only they do not overlap with each other, but they also provide adequate physical interconnections (routed according to the netlist) while meeting the performance constraints (step 102).

To guide the steps in the physical synthesis phase, timing is often used. At predefined points of the flow, the design is timed using a variety of static timing analysis tools, such as EinsTimer™. This tool identifies which gates in the design fail to meet the timing constraints. This tool is integrated with the physical synthesis engine such as, for instance, PDS™ to recalculate the timing in real time when the placement and optimization functions are applied to the design.

One of the metric commonly used and calculated by the timer is referred to as the slack. It is defined as the difference between the expected delay at a given point versus the actual delay at the same point for a predetermined placement and optimization solution. A negative slack occurs when the actual delay of the signal exceeds the expected delay, i.e., the actual arrival time follows the required arrival time. The presence of negative slack indicates that the design is unable to operate at the specified clock frequency. Conversely, a positive or zero slack is indicative that the design can operate at the predetermined frequency and, further, that at the point of measurement, the actual arrival time of a signal precedes or equals the required arrival time. One exit criteria of the physical synthesis is to create a solution where the slack at any point of the design is either zero or positive. If certain gates fail to meet their required times, (evaluated in step 106), the design must return to one of the previous steps, and appropriate corrective measures corresponding to that step must be taken. The nature of the reasons for not meeting the required times determines to which step the process is to return to and what corrective measures are to be taken within that step.

Figure 1B:
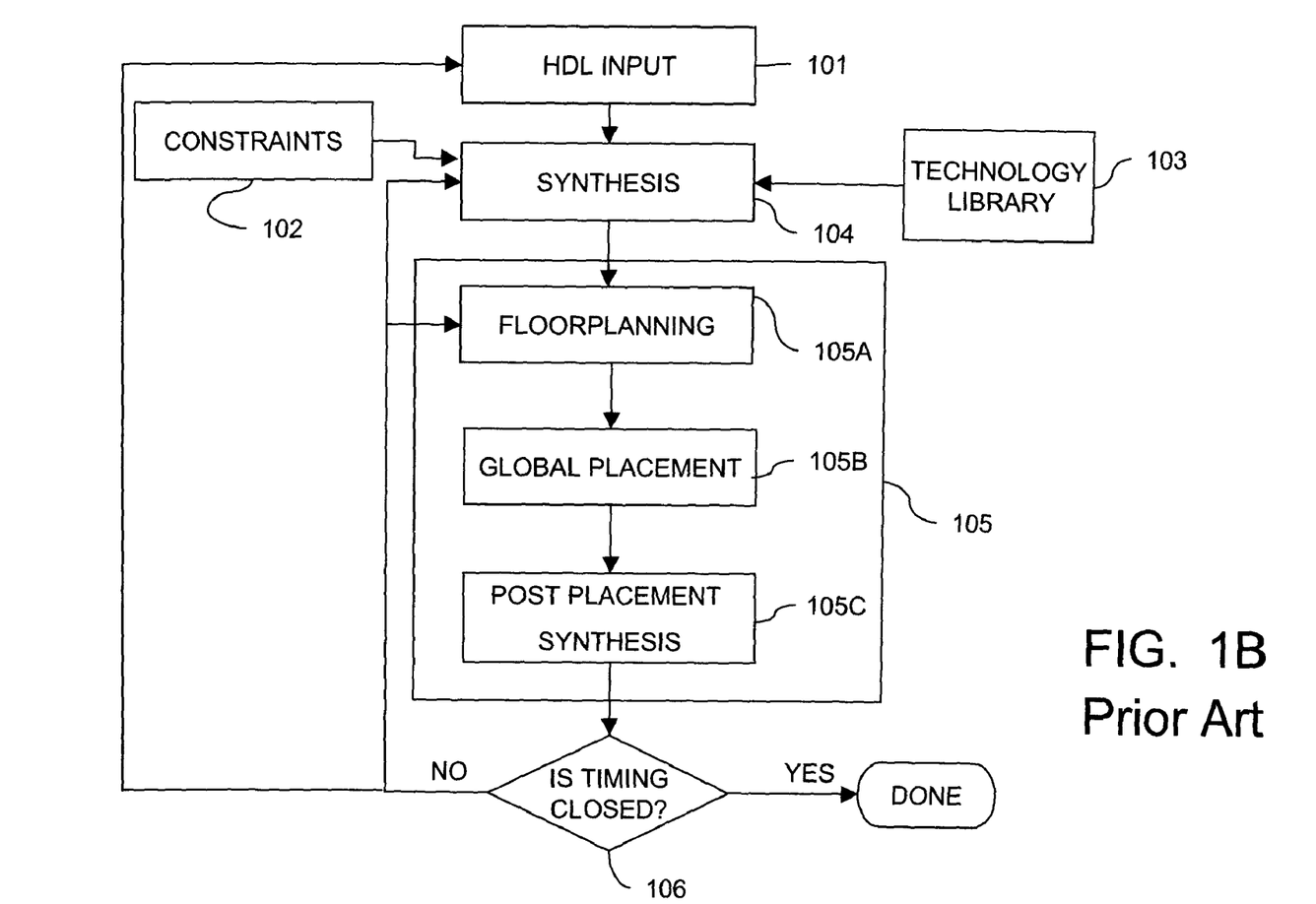

Several processes to eliminate and/or reduce negative slacks in a design during synthesis and placement phases of the design process will now be described with reference to FIG. 1b. Therein, is illustrated a detailed prior art flowchart that describes in more detail the steps related to the placement and physical synthesis.

Methods are shown in step 104 that incrementally transform the structure of individual circuits in the design while preserving the logical functionality during synthesis to eliminate negative slacks and maintaining a location independent artificial representation of the wires that interconnect the logical elements being transformed. These include:

(a) A floorplanning step wherein large blocks are fixed in position in the chip and location for external interface pins is shown in step 105a.

(b) A global placement where all circuits not explicitly placed in the floorplan step are algorithmically placed onto the chip is shown in step 105b.

(c) An incremental transformation of the structure and location of the individual circuits in the design while preserving the logical functionality during placement to eliminate negative slacks in the design. The location dependent artificial representation of the wires that interconnect the logical elements being transformed is show in step 105c. (This step is similar in scope to step 104 with the essential distinction being that a change to an interconnect (wire) model is placement dependent).

(d) Possible iterations of one or more of steps (a) through (c).

The method shown in steps (a) through (d) that incrementally transform the design includes repowering the gates (i.e., the use of gates having a different power drive), buffer insertion on nets, pin swapping, logic redesign, and the like. These methods are packaged in a flow that employs timing analysis information to determine which methods are to be selected within the flow and evaluate the success or failure of each method. The flow uses slack to determine which gates or nets are to be worked on. All the nets and/or gates having a slack below a user defined threshold are candidates for optimization. Furthermore, the flow sets a target slack thereof. Alternatively, each method is set to optimize the output slack of a given net or gate against a predetermined target. The duration of the optimization flow depends on several factors:

(a) How many times the methods are applied to each slack failing net and/or gate.

(b) The duration of each method. The restructuring of a cone of logic to which a failing gate belongs that is more costly than repowering the gate.

(c) The optimization strategy. In some cases, the flow applies a predetermined method to a gate and/or net and move to the next gate and/or net independent of the result. In other instances, the flow may apply one or several methods to the gate and/or net, selecting the one providing the best slack improvement.

(d) The time spent on recomputing the slack (incrementally updating the timing analysis). After each optimization, a timing analysis must be performed to obtain the current state of the design to minimize unnecessary optimization work. State of art optimization systems are tightly coupled to timing analysis engines that only retime the portions of the design affected by the optimization.

(e) The progress on improving the slack on the failing gates and/or nets. At any stage of the flow, the use of one optimization method or a combination thereof may result in only a marginal improvement. The optimization strategy must decide when to stop or to continue.

(f) Determining on which parts of the gates and/or nets displaying a failing slack the flow operates. In prior art optimizing systems, the flow works on all the gates and/or nets having a failing slack. However, in some systems it attempts to optimize the worst offending gates and/or nets before moving to less offending ones. This strategy may have a significant adverse impact on the runtime.

(g) How does the optimization flow determine which is a failing slack in the design. In most systems, the only ones selected form the set of failing gates and/or nets. However, the manner of how the gates and nets are connected between the latches (timing paths) is critical. A determination needs to be made whether they need to be optimized altogether.

Prior art systems designed as described previously present a number of drawbacks:

(a) The slack threshold to select portions of the design to optimize is constant (usually set to zero slack). Next, the slack target is set to a user defined value, usually a positive slack. These two values remain constant throughout the transformation and placement process. At a minimum, this constancy is maintained throughout one step (104 and 105), while in practice these values are maintained throughout the entire process such that each step selects candidates below a fixed threshold. Attempts are then made to transform every circuit path to the same constant slack target. Drawbacks include:

i) Not every circuit path below a fixed slack threshold can be optimized. A sampling of reasons for this are: 1) incorrect timing assertions or interactions that generate certain required arrival times at the end point of the path that precede the arrival time at the starting point of the path. This is an impossible situation for which no transformation to the circuit topology or structure can eliminate the negative timing slack; and 2) the negative slack on a particular path under consideration may be dominated by elements which cannot be transformed through available transformations in a particular step. For example, if a circuit path includes an SRAM, there are no transformations during the synthesis step 104 that can improve the circuit performance.

ii) The particular transformation applied to individual gates in a given step may not be able to completely eliminate the negative slack on the path even when applied to the entire path. Yet, it is still applied as if it were capable of eliminating all the slacks on the path. For instance, the circuits on the path may be underpowered or under-buffered, i.e., purely structural transformations will be unable to eliminate the negative slack because the required transformation will not be performed.

The placement may separate the initial and end points of the path by a distance which cannot be covered by the amount of time allotted by the required arrival time. No structural or topological transformations will be able to eliminate the negative slack from this path.

An inefficient logic structure exists that prevents the negative slack from being eliminated by repowering, buffering, or location altering transformation. By way of example, the logic depth may be too great to close simply by making the gate power levels greater.

(b) The fixed transformations performed in steps 104 and 105*c* apply one size fitting all the methodologies leading to inefficiencies both by the amount of time to iterate through the synthesis and placement steps as well as the actual final implementation of the transformed netlist. The reasons include:

i) Every transformation in the fixed recipe is applied to every point of the circuit path that can potentially impact the negative slack of that path without regard to whether there is a potential for the transform to actually bring about any improvement. This inevitably leads to time being wasted by applying transformations that do not work to achieve the goal of eliminating negative slack from the design.

ii) The best transformation for eliminating negative slack in a particular instance is not necessarily the first one to be applied, leading to an inefficient structural implementation of the desired logical functionality. For instance, buffering may be applied to a path wherein the starting and end points need to be moved closer together before the transform alters the circuit locations. While buffering improves but does not eliminate the negative slack, the presence of buffers limits whatever the replacement transforms can achieve. At best, they can lead to large power consumption and, at worse, they can prevent the replacement transforms from completely eliminating the negative slack from the path.

(c) The mechanism for deciding when to stop applying a transformation to a particular circuit in the design is based on accounting rather than on the ability to solve the negative slack elimination problem.

i) The decision when to stop is based on a metric such as the number of times that the circuit has been affected by the transformation or the number of times the transformation has failed to improve the negative slack from that point.

ii) Each transform must be applied a predetermined numbers of times, regardless of the results, before it ceases being applied to a particular step.

iii) Counters must be periodically reset when a later transformation alters the state of the netlist when a previous transformation having exceeded the number of required applications—inhibiting its application—now becomes useful once again. This reset is based on accounting rather than on a specific knowledge about the state of the netlist.

(d) The net effect of the existing process resides in that both time and effort are wasted and the final circuit implementation is less effective because optimizations do not assess their capabilities with respect to an encompassing flow, and maintain the underlying bad assumption that all the paths can achieve a unique slack target.

Fundamentally, there is no reason for synthesis and placement methodologies to be limited by the assumption that all the transformations must optimize all the circuits in the netlist below a fixed threshold to an identical and constant slack target. Contrived timing environments, targeted at a particular category of transformations, can provide bounds on the capability of a particular transformation category to eliminate the negative slack for a particular circuit path. These contrived environments are generally separate and artificial and, therefore, differentiated from the actual timing environment in which the circuit is expected to operate in. The synthesis and placement steps must ultimately optimize the design to the actual operating timing environment. Information from the contrived timing environments that were created to perform an analysis exist in parallel with the transformation environments or pertinent information and are carried forward to control the application of the transformations working in the design.

Related patents include:

U.S. Pat. No. 7,013,443 to Iwai describes a method for differentiating paths that can be closed by logic synthesis and those where the floorplan stretches the path too far or too close. It cannot assess the amount of timing closure that the individual optimization transforms require. Further, it cannot tell the optimization tool when to stop attempting to buffer or repower the design. The technique focuses on a hierarchical design and uses measures of logic delay that fail to reflect the true state of the design.

U.S. Pat. No. 5,095,441 to Hopper et al. describes a logic synthesis method for applying transforms (referred to rules) to gates to which a particular rule is applicable or needed. Transforms are applied in accordance to the greatest size win parameter which focuses on how many net objects are removed from the design as a hard coded user set value. Extending this concept to timing without actually applying the transform is difficult, and therefore it negates the timing closure problem.

U.S. Pat. No. 5,465,204 to Sakine uses a neural network to determine what transforms should be applied to the design in order to limit the number of design iterations. No attempt is made to classify or quantify the work to be performed by a particular transform, except through the trained neural pathways.

U.S. Pat. No. 5,903,471 to Pullela describes a method for increasing the efficiency of the applied transforms by calculating a figure of merit FOM (i.e., the cumulative sum of negative slack) reachable from each node and slack sensitivity numbers at each node of the circuit. Transforms are called on the highest leverage points firs at which are the nodes having the highest FOM and slack sensitivity. This approach does not answer the problem of which transforms to be applied and when to stop.

U.S. Patent Application No. 2006/0015836, published Jan. 19, 2006, describes a comparison between two different domains as a means of weighting nets for placement, but does not address optimization.

Thus, there is a need in industry for a method and a system capable of guarantying the correct functionality of a chip by removing negative timing slack when performing a netlist transformation after having categorized the slack.

OBJECTS AND SUMMARY OF THE INVENTION

Accordingly, it is an object of this invention to provide a method and a system to efficiently improve the timing of a VLSI chip design during placement and synthesis.

It is another object to provide a method of eliminating the negative slack of particular synthesis or incremental placement transformations.

It is still another object to provide a method that significantly speeds up the placement and physical synthesis steps by gradually reducing the design to be optimized to the gates and nets that can be physically optimized.

It is yet another object to dynamically adjust the slack target and threshold for the critical portions to be optimized to the values that can be physically implemented.

It is a further object to generate reports throughout the process showing a designer design portions that cannot be physically implemented. These guidelines are generated throughout the process by allowing the designer to obtain an early insight to what prevents the design from reaching zero or some positive slack goal.

These and other objects of the invention are provided by a method and a system for using information from contrived and possibly artificial timing environments during the transformation of a netlist under a predetermined operating timing environment.

In one aspect of the invention, a method is provided for dynamically adjusting slack targets and thresholds, report unfixable problems and speed up the process. The invention fundamentally changes the overall result by the analysis of slack feasibility at each point in the flow. This allows the dynamic setting of slack thresholds and slack targets to values that can physically be implemented by the placement and optimization tools. As a result, the speed of executing the process is significantly improved and the number of iterations within a transform is reduced because no time is wasted on optimization techniques that cannot improve the slack. The quality of results improves because the flow is not attempting to improve parts of the design that cannot be improved. Furthermore, the placement of the design is not skewed by unrealistic slack values. The process significantly speeds up the design process by eliminating wasted time, provides accurate information on the design quality the designer can use to fix the design before the physical synthesis is completed. This information includes redesign of timing assertions, critical path logic complexity that cannot be physically implemented, floorplan limitations such as wrong preplacement of large objects, inadequate pin assignment, insufficient placement area for a critical logic block, and the like.

In another aspect of the invention, after implementing each of the major tasks, the design goes through a timing analysis for a well defined type of analysis. The results can be advantageously reviewed by an analysis function that creates two reports. One report (referred to as a passive report) preferably in a user readable format tells the designer which paths of the design will not be fixed at that stage or subsequent steps of the flow. A second report (referred to as an active report) is provided in a format understood by the next flow step which provides guidelines, slack targets, and execution controls to the step under execution. Before the flow step is executed, a function guided by the active report results chooses which transforms are to be applied as well as the slack target for that step. For better understanding the invention is preferably embedded within the flow used by the Post Placement Synthesis step.

In still another aspect of the invention, there is provided a method of optimizing a design represented by a netlist in a single state of static timing analysis (TA) that determines a minimum achievable slack for a transformation category based on at least one other corresponding contrived state of the static timing analysis, the method including the steps of:

(a) performing a first and second TA on the netlist, the first TA measuring a potential impact of the synthesis or netlist transformation on the timing of the design, and the second TA modifying an environment of the first TA to create a more realistic environment in which the netlist transformation is applied to and measured;

(b) forming a constraint by transferring the output of the first TA to the second TA;

(c) using the constraint, determining which transformations have a greater potential to eliminate a negative slack by performing an optimization on the second TA environment;

(d) determining a best transformation to be applied to a current state of the netlist timing by dynamically eliminating a maximum negative slack; and (e) determining that the optimization is achieved without applying particular transformations beyond their respective capabilities, and bounding the negative slack elimination that is applied to a current state of the netlist timing.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

FIG. 1b illustrates details of the placement and post-placement physical synthesis step shown in FIG. 1a.

DETAILED DESCRIPTION OF PREFERRED EMBODIMENTS

The present invention and the various features and advantageous details thereof are explained more fully with reference to the non-limiting embodiments that are illustrated in the accompanying drawings and detailed in the following description.

In the following description, the following definitions of terms will be used.

Slack Threshold—value of slack used to select gates and/or nets with a logic path for optimization.

Slack Target—value of output slack given to an optimization function as goal of the slack to be optimized against.

Transform Optimization—set of actions applied to a plurality of gates and/or nets that change some characteristic of the gate or the net. These actions include, e.g., changes of power level of a gate, decomposition of a gate into multiple logically equivalent gates, insertion of buffers on a net, pin swapping between nets while preserving the logic functionality, and the like.

Figure 3:
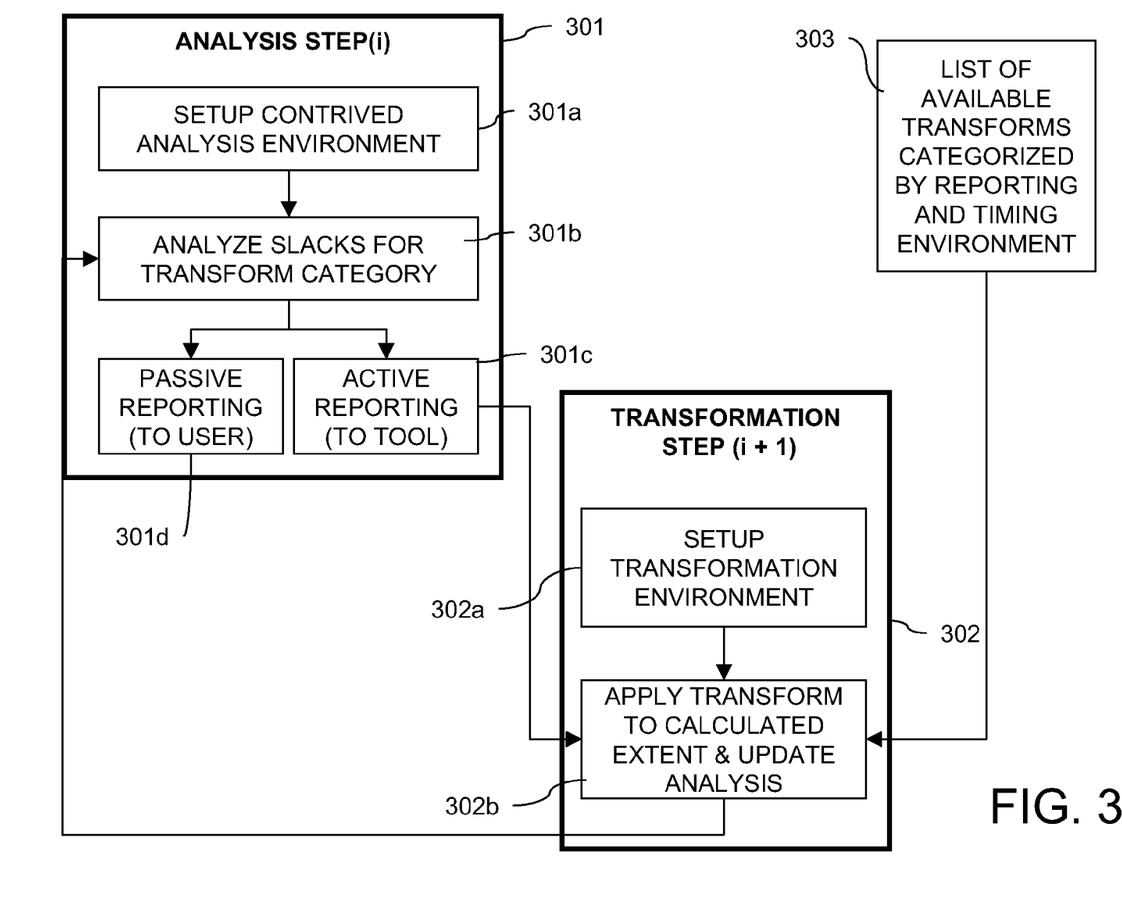
FIG. 3 illustrates analyses and transformation steps linked to an illustrative listing of available transforms categorized by reporting and timing environment, according to a preferred embodiment of the invention.

Referring to FIG. 3, there is shown a high level flowchart according to a preferred embodiment of the present invention. The preferred embodiment includes at least one analysis component for a particular transformation step (301), at least one transformation step (302) designed to alter the circuit in a way that reduces the negative slack, and a list of available transformations (303) that were categorized according to one or more analysis environments. Communication is maintained between the analysis and the transformation components. The analysis component is preferably inputted to the design netlist including timing assertions corresponding to the step applied thereto. The transformation component receives the active report information and adjusts slack targets and thresholds for the optimization transforms. Moreover, it prunes the optimization transforms to be applied to the next step.

Step 301 describes the analysis portion of the present embodiment at some step i of the flow that determines the maximum achievable slack for the category of transformations it represents. The first phase of the analysis (step 301a) consists of setting up the desired environment to create conditions that expose the limitations of a particular set of circuit altering transformations. This preferably includes manipulating the static timing environment, circuit operating conditions, or the netlist itself. Examples of manipulation are the temporary setting of the delay of gates and nets to zero; the temporary setting of net delay and input pin capacitance to zero; and temporarily hiding a portion of the netlist for timing analysis.

Once the contrived environment has been created, a timing analysis is performed (step 301b) and the worst slack at each timing point is measured and assigned as the upper bound. These upper bounds (referred to Si) become a target for the transforms to be applied in the next optimization step (step 302). The lists of paths failing to meet a particular slack target are optionally reported to the designer via a readable format file (step 301d). For example, if the gates and wires delay is set to zero, following the timing analysis paths exist displaying a negative slack. Then, the physical synthesis are not be able to close timing on these paths, and the designer will be forced to change the timing assertions.

In another output of the analysis (step 301c), an active report that changes the way optimization is applied to the design is described in the next step (step 302). The report is known as being active because it alters which paths are optimized and how they are to be optimized in the next step (i+1).

Subsequent transformation steps referenced by numeral 302 take the reported information (step 301c) and use it to manipulate how transformations are to be applied to the circuit. For example, for the case previously illustrated, any path having a negative slack (Si<0) an after zero gate and a net delay analysis are performed, and will only be optimized to this negative value instead of zero by the netlist transformations associated with the analysis environment of step 301. All the remaining paths having a positive slack are optimized to a different target, e.g., the initial target set for the entire design St. In the event where only a single analysis step has taken place, the analysis provides a second upper bound on an achievable slack for a given category of transformations in addition to the overall slack target St. With the analysis information for a given category completed, transformations are applied to the design such that the target slack for that transform is the minimum of (St, Si).

In the event wherein more than one analysis step 301 exists, the transforms in step 302 will be targeted to the minimum of the slack values determined by multiple 301 steps (St, Si1 . . . Sin). It also allows the recipe for the application of transforms to be dynamically tuned by selecting the transform to be applied as the one achieving the maximum Si for the current state of the design. Upon applying the transform, it may become necessary to update the analysis environments with the new state of the netlist, which will, in turn, alter the corresponding Si values.

EXAMPLE

Figure 4:
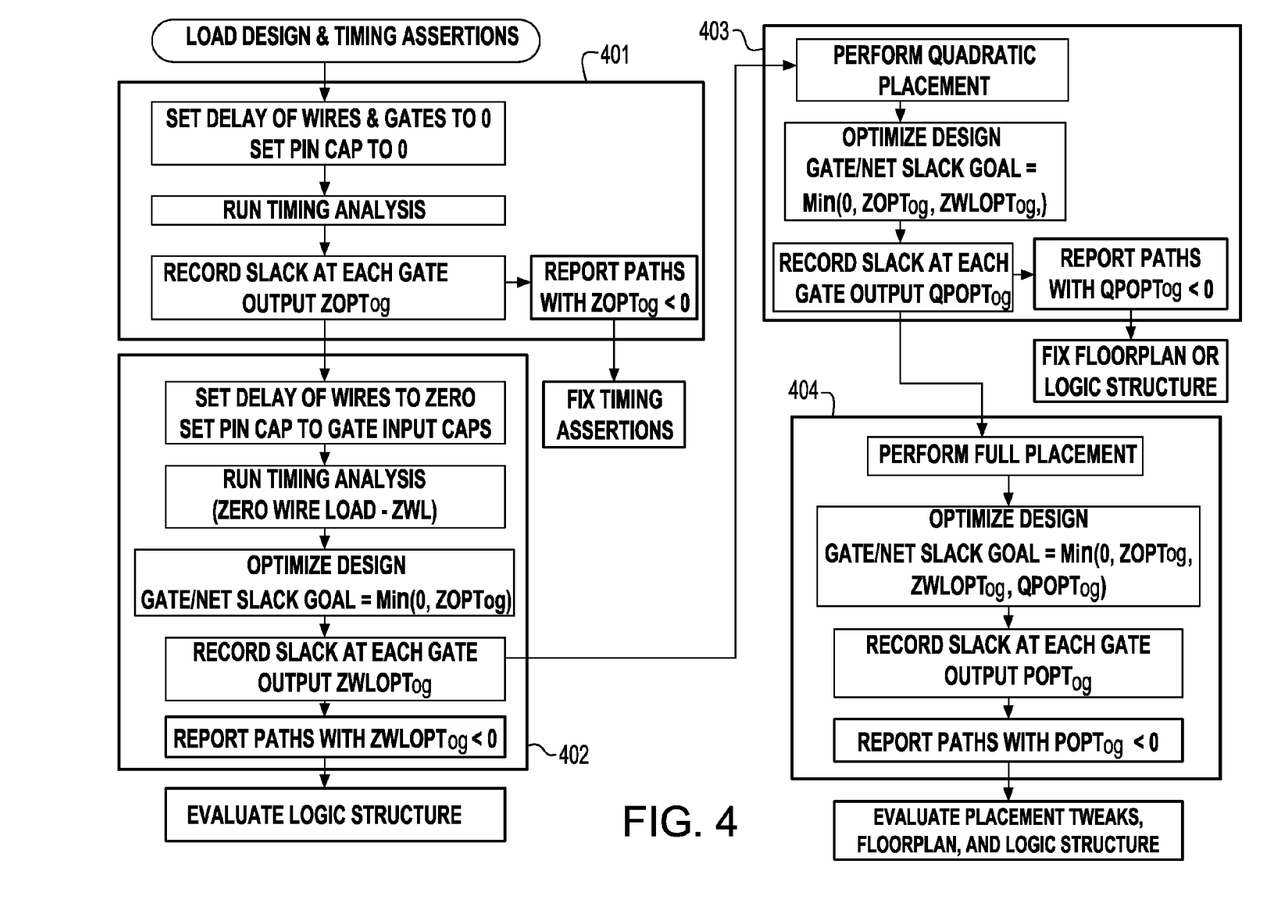
FIG. 4 is an illustrative example corresponding to the preferred embodiment of the invention described in FIG. 3.

Referring to FIG. 4, there is shown an exemplary implementation corresponding to the preferred embodiment. The technique is not limited to the timing environments or transformations to be illustrated hereinafter. The design is first loaded and timing assertions are applied. For the purposes of the illustrative example, it will be assumed that all transformations belong to a single category.

In the initial step, the contrived timing environment is setup (step 401) with all the gates and wires having zero delay and all the pin capacitances being forced to zero. This environment is designed to expose slack failures that are caused by timing assertions since no other netlist elements will contribute to the circuit delay. Timing analysis is run on the design to obtain the list of slacks at each timing point. This list is referred to as the ZOPTog list. The list of negative slacks ZOPTog is reported to the user so that timing assertion adjustments can be made. This information is subsequently carried forward to the next step (step 402).

Figure 2:
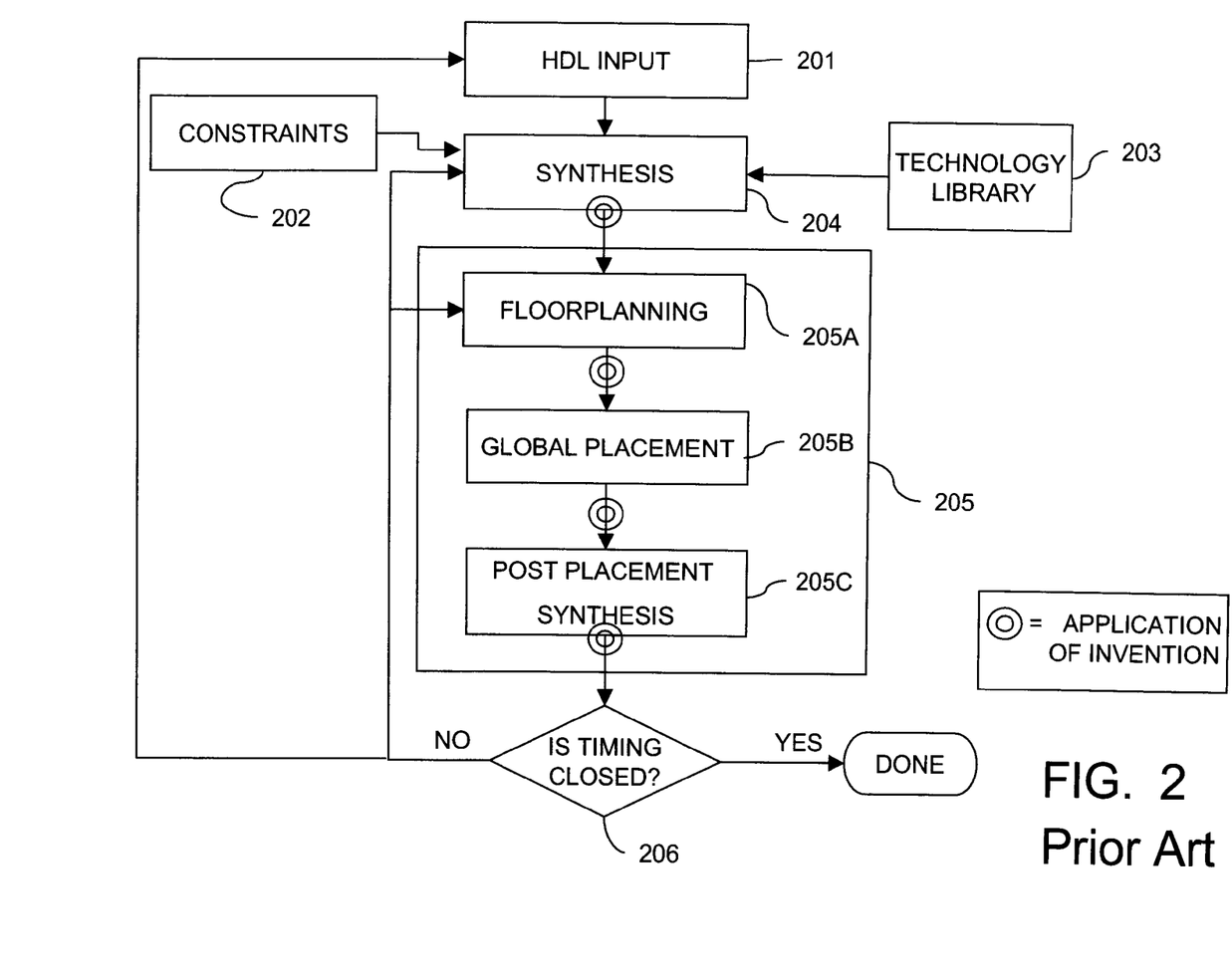
FIG. 2 shows a further expansion of the prior art flow chart as it is merged with the prior art flow shown in FIGS. 1a and 1b.

Step 402 consists of both an analysis and transformation step. Analysis and transformation environment setups both include a timing environment which the wires are modeled after when having zero delay. This contrived timing environment is designed to expose problems within the logic structure of the design. The transformations applied are actually part of the analysis environment setup. The circuit is optimized using the available transform techniques such that paths are optimized against the minimum between the global slack target (usually zero slack) and the ZOPTog value for the circuit, that represents the maximum slack for the given assertions. As illustrated in FIG. 2, the optimization step is an iterative process that is applied to the netlist while the metric improves. This metric includes, for example, the worst slack in the design, the number of gates having a failing slack, and the like. Upon completion of the netlist transformation, the updated slack values from timing analysis at each timing point (negative as well as positive) are stored in a list referred to as ZWLOPTog. If any transformation has the ability to affect the ZOPTog slack values, then the analysis step 401 must be performed, and the ZOPTog values updated as appropriate. Paths having a negative slack in the ZWLOPTog list indicate that the number of gates in the path used to implement a logic function require more delay than what was budgeted for that path. If logic restructuring transforms were also used during optimization and the slack remains negative, it is an indicative that either the assertions are too constraining or the logic structure is too complex. In either case, the passive report at this step lets the designer know that changes are required (assertions or logic) to fix these paths. The active report propagates the ZWLOPTog values forward in the netlist such that at the next step in the flow (step 403) these values are used as limiting targets for the paths that have them.

Step 403 is a transform and analysis stage, designed to expose problems associated with the design floorplan. Both the transform and the analysis environment use a timing setup wherein Steiner wire length estimates are employed to compute the delays on the wires. The gates in the design are preferably placed in quadratic wire length minimum locations within the larger block floorplan. All available transforms are then applied to the design in this state, in an attempt to achieve a slack value that is the minimum between three values: the global slack value of zero, the slack value from list ZOPTog and the slack value from list ZWLOPTog. During the course of the transformations, any transform impacting ZOPTog or ZWLOPTog timing values triggers an update from the analysis phases (steps 401 and 402, respectively) which, in turn, will update the values used in step 403. The end of the optimization indicates that the analysis environment setup is complete, and the slack values are stored as QPOPTog (i.e. the slack obtained when the design is simulated including the gate and wire delays) for each timing point. This information is reported to the user to determine whether problems exist in the floorplan, logic structure, and assertions. Next, the information is forwarded to step 404.

Step 404 represents the final stage of the present example, where the analysis phase has no next forward step to feed information to; thus, only user reports are generated. The step is designed to find maximum slack values for a fully placed and optimized design using Steiner wire length estimates to calculate the wire delay. The transformations applied will again be part of the analysis environment setup. All available transforms will be executed to obtain the maximum slack at each timing point as determined by the minimum (0, ZOPTog, ZWLOPTog, QPOPTog). During the course of the transformations, any transform that impacts the ZOPTog, ZWLOPTog, and QPOPTog timing values will trigger an update from the analysis phases in steps 401, 402, and/or 403 respectively which, in turn, will update the values used in step 404. Upon termination of the optimization phase, the analysis environment setup is completed and the slack values are stored as POPTog for each timing point. This information can be advantageously reported to the user to determine problems in the placement, floorplan, logic structure, assertions, and the like.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be evident to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method of optimizing a design represented by a netlist in a single state of static timing analysis (TA) that determines a minimum achievable slack for a transformation category based on at least another corresponding contrived state of the static timing analysis, the method comprising:

a) using a computer, performing on a first and second TA on the netlist, the first TA measuring a potential impact of a synthesis or netlist transformation on a timing of the design, and the second TA modifying an environment of the first TA to create a more realistic environment in which the netlist transformation is applied to and measured;

b) forming a constraint by transferring an output of the first TA to the second TA;

c) using the constraint, determining which transformations have a greater potential to eliminate a negative slack by performing an optimization on the second TA environment;

d) determining a best transformation to be applied to a current state of the netlist timing by dynamically eliminating a maximum negative slack; and e) determining that the optimization is achieved without applying particular transformations beyond their respective capabilities, and bounding the negative slack elimination that is applied to a current state of the netlist timing.

2. The method of claim 1 further comprising the step of determining when the transformation applied to the second TA impacts the timing of the first TA environment (TAE), generating changes in the netlist that are reflected back to the first TAE.

3. The method of claim 2, wherein if a change causes the timing to differ on the first TAE, then updated constraints are forwarded to the second TAE.

4. The method of claim 3, wherein said first and second TAs are performed concurrently.

5. The method of claim 3, wherein said first and second TAs are performed sequentially.

6. The method of claim 1, wherein the netlist transformations are grouped in categories according to a criteria determined by their respective impacts on the netlist timing.

7. The method of claim 6, wherein based on the constraint generated in the first TA environment, the netlist transformations are altered in a manner where the order of transformation is executed from ones producing a greatest impact to those producing a least impact.

8. The method of claim 1, wherein slack targets and thresholds are dynamically adjusted to values that are physically implemented by placement and optimization tools.

9. The method of claim 1, wherein speed of execution is improved by eliminating iterations within the transformations which cannot improve the slack.

10. The method of claim 1, wherein reports are generated showing a designer portions of the design that cannot be physically implemented, providing an early insight to what prevents the design from reaching zero or a positive slack.

11. An article of manufacture comprising a non-transitory computer usable medium having computer readable program code means embodied therein for causing a chip design represented by a netlist in a single state of static timing analysis (TA) that determines a minimum achievable slack for a transformation category based on at least one other corresponding contrived state of the static timing analysis, the computer readable program code means in said article of manufacture comprising computer readable program code means for causing a computer to effect method steps of:

a) using a computer, performing a first and second TA on the netlist, the first TA measuring a potential impact of a synthesis or netlist transformation on a timing of the design, and the second TA modifying an environment of the first TA to create a more realistic environment in which the netlist transformation is applied to and measured;

b) forming a constraint by transferring an output of the first TA to the second TA;

c) using the constraint, determining which transformations have a greater potential to eliminate a negative slack by performing an optimization on the second TA environment;

d) determining a best transformation to be applied to a current state of the netlist timing by dynamically eliminating a maximum negative slack; and e) determining that the optimization is achieved without applying particular transformations beyond their respective capabilities, and bounding the negative slack elimination that is applied to a current state of the netlist timing.

* * * * *